(No Model.)  6 Sheets—Sheet 1.

H. H. CUMMINGS.
BUTTON SEWING MACHINE.

No. 397,587. Patented Feb. 12, 1889.

Fig. 1.

WITNESSES:
H. Brown.
Rich'd H. Jones

INVENTOR:
Henry H. Cummings,
by Wright, Brown & Crosley
attys (No Model.) 6 Sheets—Sheet 2.

H. H. CUMMINGS.
BUTTON SEWING MACHINE.

No. 397,587. Patented Feb. 12, 1889.

Fig. 2.

WITNESSES:
H. Brown
Rich'd H. Jones

INVENTOR:
Henry H. Cummings
by Wright, Brown & Crosley
attys (No Model.) 6 Sheets—Sheet 3.

H. H. CUMMINGS.
BUTTON SEWING MACHINE.

No. 397,587. Patented Feb. 12, 1889.

WITNESSES:
H. Brown
Rich'd H. Jones

INVENTOR:
Henry H. Cummings
by Wright, Brown & Crosley
Attys.

(No Model.)  6 Sheets—Sheet 4.

H. H. CUMMINGS.
BUTTON SEWING MACHINE.

No. 397,587.  Patented Feb. 12, 1889.

WITNESSES:
H. Brown.
Rich'd H. Jones

INVENTOR:
Henry H. Cummings.
By Wright, Brown & Crossley
attys.

(No Model.) 6 Sheets—Sheet 5.

H. H. CUMMINGS.
BUTTON SEWING MACHINE.

No. 397,587. Patented Feb. 12, 1889.

WITNESSES:
H. Brown
Rich'd H. Jones

INVENTOR:
Henry H. Cummings
by Wright, Brown & Crossley.
att'ys.

(No Model.) 6 Sheets—Sheet 6.
H. H. CUMMINGS.
BUTTON SEWING MACHINE.

No. 397,587. Patented Feb. 12, 1889.

WITNESSES:
H Brown
Rich'd H Jones

INVENTOR:
Henry H. Cummings
by Wright, Brown & Crosskey
attys

UNITED STATES PATENT OFFICE.

HENRY H. CUMMINGS, OF MALDEN, ASSIGNOR TO THE UNION BUTTON SEWING MACHINE COMPANY, OF BOSTON, MASSACHUSETTS.

BUTTON-SEWING MACHINE.

SPECIFICATION forming part of Letters Patent No. 397,587, dated February 12, 1889.

Application filed May 12, 1887. Serial No. 237,297. (No model.)

*To all whom it may concern:*

Be it known that I, HENRY H. CUMMINGS, of Malden, in the county of Middlesex and State of Massachusetts, have invented certain new and useful Improvements in Button-Sewing Machines, of which the following is a specification.

My invention relates to "button-sewing machines," so called, and has for its object to adapt a machine of the kind mentioned to "sewing on" a four-hole button with either a "cross" or "parallel-bar" stitch, as well as to sewing on bar and two-hole buttons, and to provide a construction whereby the machine may be readily changed from one kind of work to another and "set" to perform the work it is desired that it shall do.

My invention consists in improvements for operating and controlling the operations of the button-holder, so as to present the button in proper position to the needle.

My invention also consists in improvements incidental to the foregoing.

I will now proceed to describe my invention, so that others skilled in the art to which it appertains may be able to make and use the same, reference being had to the accompanying drawings, and to the letters of reference marked thereon, forming a part of this specification, the same letters indicating the same parts wherever they occur.

In proceeding with a detailed description of my improvements I will first refer briefly to parts of a sewing-machine which are old and of common construction, as also to parts in a button-sewing machine which constitute no part of my present invention, then describe the several groups of devices constituting my improvements, tracing their construction and operation from their source of power to the end of their particular functions, and finally set forth the manner in which the various contrivances co-operate in the complete machine.

A represents the bed of the machine; B, the overhanging arm; C, the standard supporting the same; D, the main shaft; E, the driving-pulley on the main shaft; F, an eccentric on the main shaft; G, (represented in dotted and full lines in Fig. 2,) a pitman connected at its lower end with eccentric F and at its upper end with needle-shaft H to impart a rocking motion to the latter; I, the needle-bar, adapted to be reciprocated by the needle-shaft; J, the needle; K, a rotary hook on the forward end of the main shaft; L, the raceway of the rotary hook and means for supporting the same in position; M, a grooved cam on the main shaft for operating the thread take-up N; O, the spool, and P the thread-tension. These parts may be of the construction shown or of any other known or equivalent form, said parts constituting no part of my present improvements, being shown merely for the purpose of explaining the manner in which my improvements may be applied to button-sewing machines or sewing-machines of common construction.

The driving-pulley E is constructed to turn loosely on the main shaft D and to be connected therewith at desired times by any suitable clutch mechanism, the devices here represented being a dog, Q, hinged or pivoted on a collar secured to the main shaft, and having its outer free end normally held within the path of travel of a laterally-projecting pin, R, on the driving-pulley E by a spring, S. The angular part T of clutch-lever U is adapted at times, as hereinafter explained, to be brought within the line of travel of dog Q and move said dog on its pivot against the tension of spring S, and so permit pin R on the driving-pulley to pass and said wheel to turn freely on the main shaft without operating the machine. At the same time that clutch-lever U is moved as aforesaid to bring the angular part T in the line of travel of dog Q said lever will be carried toward the main shaft, so as to be engaged by the locking device V, attached to cam M, so as to stop the rotation of shaft D at precisely the same point each time that driving-pulley E is unclutched from said shaft.

Figures 4, 16, 17, 18, 19, 20, 21, 22:
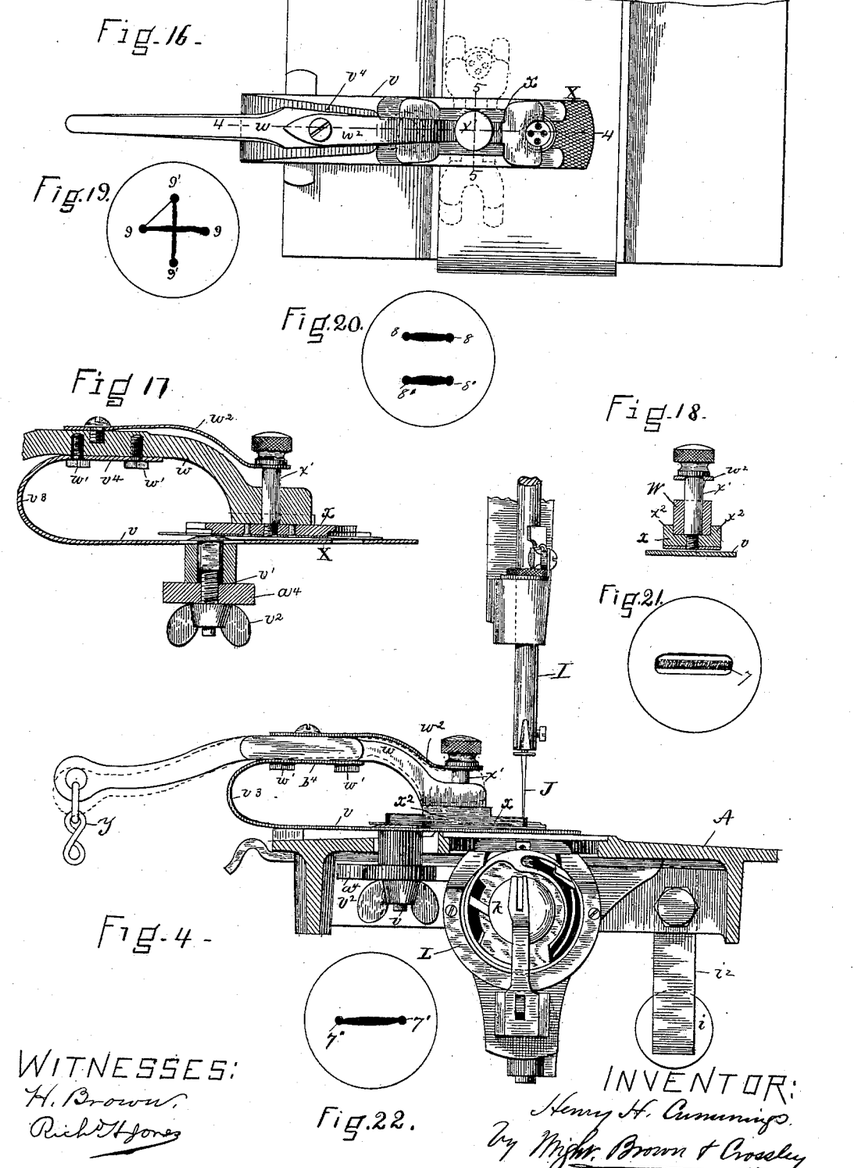
Fig. 4 is a left-hand end view of the parts connected with the bed of the machine, the latter being represented as in section, and showing also the needle and portions of the needle-bar and parts associated therewith to support and guide the same.
Fig. 16 is a top plan view of the button-holder and presser-foot and part of the bed-plate, a four-hole button being shown in position in the holder.
Fig. 17 is a sectional view taken on the line 4 4, Fig. 16.
Fig. 18 is a sectional view taken on the line 5 5, Fig. 16.
Figs. 19, 20, 21, and 22 are diagrams of sewed-on buttons, showing the work that my improved machine is adapted to perform.
Figures 5, 8:
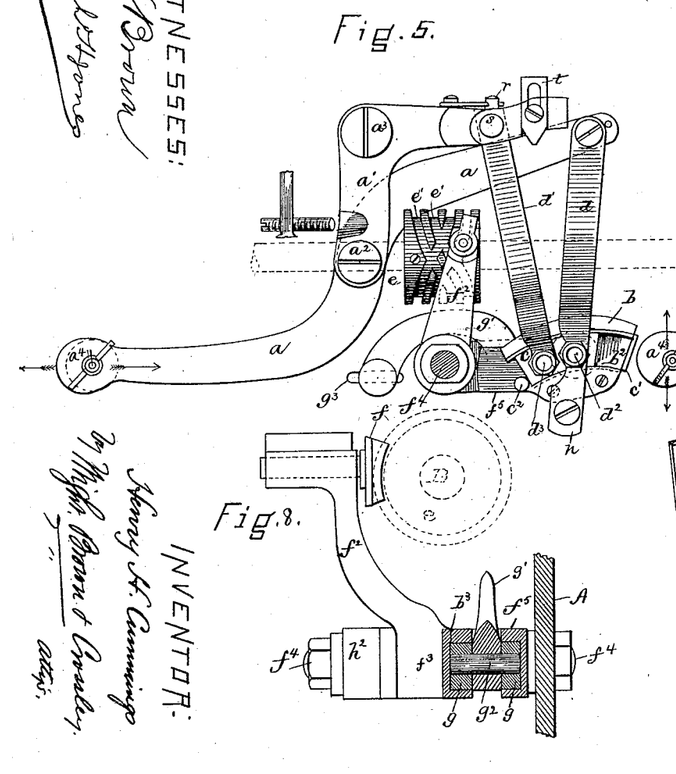
Fig. 5 is a bottom plan view of certain parts connected with the lever for operating the button-holder, the parts being pictured as in position for reciprocating the button in one direction.
Fig. 8 is a detail sectional view taken on the line 2 2, Fig. 6, looking in the direction of the arrow.
Figures 6, 7:
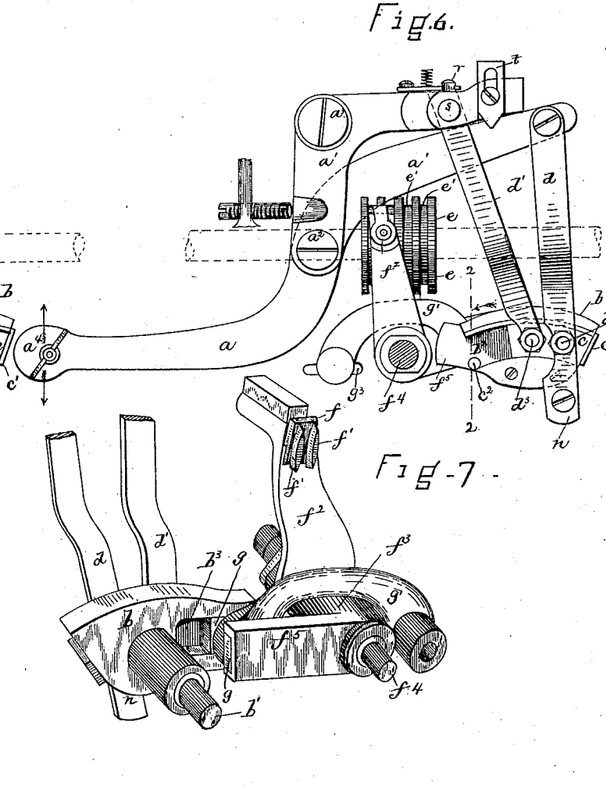
Fig. 6 is a view similar to that shown in Fig. 5, showing the parts as in position to reciprocate the button in a direction at right angles to the direction in which it would be moved with the parts in position as pictured in Fig. 5.
Fig. 7 is a detail perspective view of the parts shown in Figs. 5 and 6 as viewed from above or from the opposite side to that seen in said figures.

Having special reference to Figs. 5 and 6, $a$ represents a lever for operating the button-holder and presser-foot. Said lever is of a form approaching an S shape, and is provided with an angular arm or branch, $a'$, pivoted at one of its ends, as at $a^2$, to the main part $a$, and at its angular point, as at $a^3$, to the bed of the machine. From the form and arrangement of the button-holder-operating lever and its connections, it will be seen that when it is moved to a slight extent on its pivotal point $a^3$ the end $a^4$, attached to the button-holder, will to all intents and purposes be moved in a horizontal line, as indicated by the arrow in Fig. 5, so as to present one eye of a four-hole button and then the one opposite thereto to the needle, as indicated by 9 9, Fig. 19, and when said lever $a$ is rocked on its pivot $a^2$ its end $a^4$ will be moved on a line substantially at right angles to that just described, as indicated by the arrows in Fig. 6, the result of which will be to present the eyes 9′ 9′ of the button shown in Fig. 19 to the needle, sewing on the button with a cross-stitch. The distance or extent to which the end $a^4$ of lever $a$ is moved is of course slight, being sufficient merely to present first one hole in a button and then the hole opposite to the needle of the machine.

The means for effecting the operation of lever $a$, as aforesaid, are represented in Figs. 5 to 8, inclusive, and will next be described.

$b$ indicates what I term a "quadrant," fulcrumed or pivoted on a stud, $b'$, secured to the bed A. Said quadrant is provided on its lower face with a curved groove, $b^2$, and in its upper face, at one side of its pivotal point, with a groove, $b^3$. (See Fig. 7.)

$c$ indicates a block fitted to slide in groove $b^2$ of the quadrant, and held therein in any suitable manner, a clip, $c'$, being shown as secured to the side of the quadrant at one end of groove $b^2$ to limit the movement of block $c$ in one direction, and a pin, $c^2$, secured in the quadrant at the other end of said groove to limit the movement of the block in the other direction.

$d$ indicates a bar or rod pivoted near one end to block $c$ and at the other end to the rearward end of the main portion of lever $a$, and $d'$ indicates a bar or rod having one end also pivoted to block $c$ and the other pivotally connected with branch $a'$ of lever $a$ at or near the rearward end thereof. The construction of block $c$ and its relationship to quadrant $b$ and rods or bars $d$ $d'$ are such that when said block is moved against stop-pin $c^2$ the center of pivot $d^2$, by which bar or rod $d$ is connected to block $c$, will be directly under or in line with the axis of the pivot connecting quadrant $b$ with the bed of the machine, with the pivotal point $d^3$ of lever $d'$ to one side thereof, as represented in Fig. 5, and when said block $c$ is moved against clip or stop $c'$ pivot $d^3$, connecting bar or rod $d'$ with said block, will be in line with the pivot of the quadrant, and the pivotal point $d^2$ of bar or rod $d$ will be to one side thereof, as shown in Fig. 6. If now quadrant $b$ should be rocked on its pivot, with the parts in the position in which they are represented in Fig. 5, bar or rod $d'$ will move lever $a$ through its branch arm $a'$ and on its pivotal connection $a^3$ with the bed of the machine to move the end $a^4$ of said lever in the direction of the arrows in said last-mentioned figure, bar or rod $d$ having no effect upon said lever $a$; but when block $c$ is shifted in slot $b^2$ of quadrant $b$ to the position represented in Fig. 6, the pivotal connection of rod or bar $d'$ with said block being in line with the axis of the pivot of the quadrant, said rod $d'$ will be rendered inoperative, and bar or rod $d$ will effect a movement of lever $a$ on its pivot $a^2$, by which it is connected to branch $a'$, and operate the end $a^4$ in the direction indicated by the arrows in Fig. 6.

The means for effecting the rocking movement of quadrant $b$ will next be described.

Figure 14:
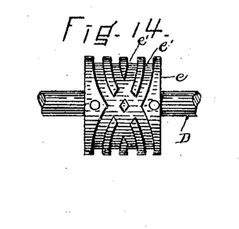
Fig. 14 is a view of the switch-cam.

$e$ represents a switch-cam, consisting of a cylindrical body secured to main shaft D, and provided in its face with double grooves $e'$ running therearound and crossing each other at a certain point, as represented in Figs. 5 and 14.

$f$ represents a traveler, consisting of two shoes, $f'$ $f'$, (see Fig. 7,) adapted to run in the cam-grooves $e'$ of the switch-cam $e$, secured to or forming part of a plate pivoted to the free end of a switch-lever, $f^2$, which latter device is integrally or otherwise rigidly connected with a sleeve, $f^3$, adapted to turn on a pin or stud, $f^4$, secured to the bed of the machine. On the end of sleeve $f^3$ opposite that to which switch-lever $f^2$ is connected therewith is formed an arm, $f^5$, extending at right angles rearwardly above quadrant $b$, as best seen in Fig. 7. Said arm $f^5$ is provided on the side facing quadrant $b$ with a groove corresponding to groove $b^3$, and in each of said grooves is arranged a block, $g$, of such size and form as to adapt it to slide therein, and between said blocks and quadrant $b$ and arm $f^5$ extends one end of a curved stitch-regulating lever, $g'$, pivotally connected with said blocks $g$ $g$ by means of a pin, $g^2$. Said lever $g'$ extends from its pivotal connection with blocks $g$ $g$ around sleeve $f^3$, and is pivotally secured in a slot, $g^3$, in bed A, so that it can be adjusted therein for a purpose to be presently explained. As main shaft D is rotated, switch-lever $f^2$ will be rocked on its pivot $f^4$ and, through the medium of sleeve $f^3$, arm $f^5$, and the described devices pivotally connecting said arm with quadrant $b$, rock the latter on its pivot $b'$, effecting the functions hereinbefore described. By adjusting the pivot-connecting lever $g'$ with the bed at different points in slot $g^3$ the pivotal connection of arm $f^5$ with quadrant $b$ may be varied, so as to vary the throw of the rocking movement imparted to the latter, as also the extent of the movement of lever $a$, operated thereby, in a way that will be readily understood.

I provide means for automatically shifting block $c$ in quadrant $b$ at the proper times, in order to effect the sewing on of a four-hole button with a cross-stitch, as hereinbefore described, and connect such means with the mechanism for starting and stopping the machine, so that when the machine is started by a single act of the operator a predetermined number of stitches will be taken through the pair of eyes of the button, the mechanism then changed to take a predetermined number of stitches through the other pair of eyes, and the machine then stopped in position to begin the sewing on of another button. The construction and operation of these devices will next be described.

$h$ represents a three-armed lever pivoted on a stud or pin, $h'$, screwed in a bracket, $h^2$, secured to the stud $f^4$, upon which switch-lever $f^2$ is fulcrumed. A chain, $i$, is secured by one end to the end of arm $h^3$ of said lever $h$ and passes over a pulley, $i'$, secured to a bracket, $i^2$, attached to the bed of the machine, said chain passing down to a treadle or knee-lever, (not shown,) or any other equivalent device of common construction, whereby the operator may be enabled to draw down on the chain and move lever $h$ on its fulcrum or pivot $h'$ against the tension of spring $h^4$, attached at one end to bracket $h^2$ and at the other to arm $h^5$ of lever $h$, the normal position of said lever $h$ being that in which it is pictured in Fig. 1. When the operator draws down on chain $i$, so as to rock lever $h$ upon its fulcrum $h'$, the end of arm $h^5$, which curves upwardly, will engage shipper-lever U and move it back against the tension of springs W, bearing thereagainst, which will carry the angular part T of the shipper-lever away from dog Q, and permit pin R of driving-pulley E to engage therewith and so rotate main shaft D, the same movement of the clutch-operating lever freeing the locking device V therefrom and placing all of the parts mentioned in the position represented in Fig. 1.

Figure 1:
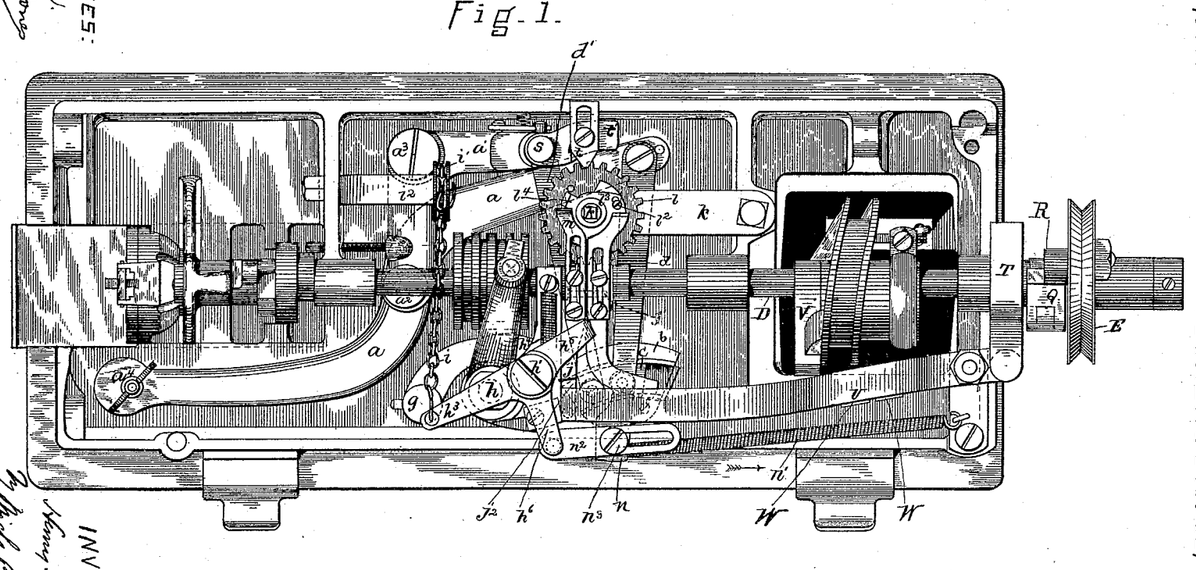
Figure 1 represents a bottom plan view of a button-sewing machine equipped with my improvements.

In order to lock or latch clutch-operating lever U back in operative position, I provide a lever, $j$, pivoted on a stud, $j'$, (shown in dotted lines in Fig. 1 and in full lines in Fig. 9,) projecting outwardly from bracket $h^2$, the rearward free end of which lever is provided with a notch or offset at $j^2$, Fig. 1, upon or behind which lever U may be locked, lever $j$ being pressed downwardly by a spring. (Not shown.)

Figures 3, 9, 10:
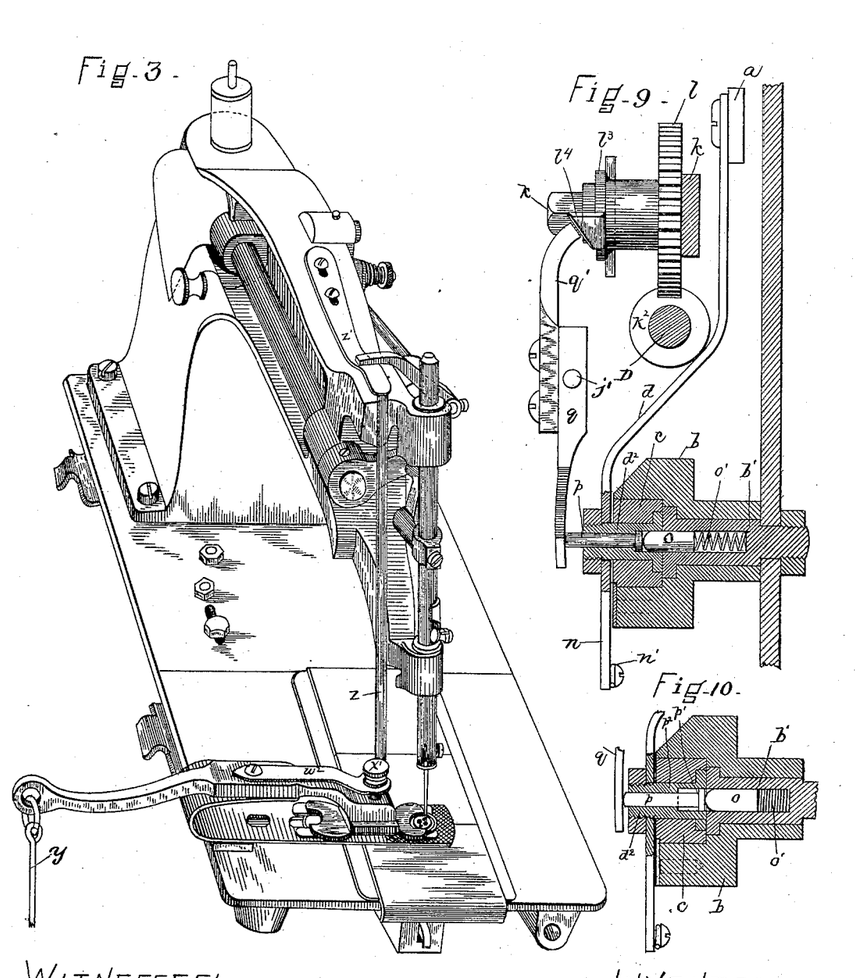
Fig. 3 is an isometric view showing the construction and arrangement of the parts on and above the bed of the machine.
Fig. 9 is a sectional detail view of certain parts hereinafter described, the devices for reciprocating the button-holder being in the position pictured in Fig. 5.
Fig. 10 is a sectional detail view, also described hereinafter, the devices for reciprocating the button-holder being in the position pictured in Fig. 6.

$k$ indicates a bracket attached to the bed of the machine, to which bracket is secured a stud, $k'$, forming a journal-bearing for a worm-wheel, $l$, constructed and arranged to be engaged by a worm, $k^2$, on main shaft D and be rotated thereby. Worm-wheel $l$ is provided with an elongated downwardly-extending hub or sleeve, $l'$, to the lower end of which is secured by means of dowels (not shown) a plate, $l^3$, provided with a cam projection or wiper, $l^4$, adapted as the worm-wheel is rotated to come in contact with the upwardly-bent end of a finger, $m$, adjustably secured to lever $j$ and forming an extension thereof. Said lever $j$ and its extension-finger $m$ are somewhat similar in form to the lever and its extension-finger pivoted on stud $j'$, as shown in Fig. 9 and to be presently described.

As main-shaft D is rotated, worm-wheel $l$ will be operated, carrying around with it plate $l^3$ and wiper $l^4$, attached thereto, until said wiper is brought in contact with the upwardly-extending end of finger $m$, which effects a depression of said end of said finger and a consequent raising of the opposite end of lever $j$, releasing or unlatching clutch-operating lever U and effecting a stopping of the machine, as before described.

Rod or bar $d$ is provided with a part, $n$, extending rearwardly from the point at which it is pivotally connected to block $c$, and a spring, $n'$, is attached by one end to the rearward end of said extension and at the other end to the bed of the machine, as shown in Fig. 1, the tendency of said spring being to draw part $n$ of bar $d$ in the direction of the arrow marked in said last-mentioned figure. Arm $h^6$ of lever $h$ is provided on its end with an upwardly-projecting stud, to which one end of a link, $n^2$, is pivoted, the opposite end of which link is provided with a slot, through which extends a stud or screw-pin, $n^3$, connecting said link with extension $n$ of the bar $d$. Pin $n^3$ is adapted to move freely in the slot of link $n^2$, so that said link may be moved a slight distance without affecting the position of bar $d$ and its connections. When, however, lever $h$ is rocked on its fulcrum $h'$ a sufficient distance to cause the upwardly-extending end of arm $h^5$ to engage clutch-operating lever U and set or latch said lever in position to permit the machine to operate, link $n^2$ will be drawn forward or in a direction opposite to the flight of the arrow in Fig. 1, drawing part $n$ and block $c$, to which it is pivoted, in the same direction, and moving said block to the position in groove $b^2$ of quadrant $b$ in which it is represented in Fig. 5, in which position said block is latched or locked for the time being by the means which I will now proceed to describe.

$o$ indicates a pin fitted to operate in a hole or bore made in the stud or bolt $b'$, forming a fulcrum-bearing for quadrant $b$, and $o'$ indicates a spring placed in said bore or hole, upon which pin $o$ is seated and by which said pin is pressed downwardly. The pivotal stud $d^2$, by which bar or rod $d$ is connected to block $c$, has a hole or bore formed therethrough, and a pin, $p$, is arranged in said bore, as shown in Figs. 9 and 10. When the slide $c$ is moved to the position pictured in Fig. 5, the hole in pivot-stud $d^2$ will be brought to register with pin $o$, and the latter will be pressed upward by spring $o'$ into the hole in stud $d^2$, locking the slide in position. Pin $o$ in the downward movement will bear against the upper end of pin $p$, pressing the latter down until its head $p'$ is brought to bear against offset $p^2$ of the hole or bore in stud $d^2$. (See Fig. 9.)

Block $c$ may be shifted from the position in which it is represented in Fig. 5 to that in which it is pictured in Fig. 6 by pressing upward on the lower end of pin $p$ until pin $o$ is pressed back far enough to just escape stud $d^2$, when spring $n'$, operating on the extension $n$ of bar or rod $d$, will draw slide $c$ over from contact with stop-pin $c^2$ against stop-clip $c'$, as represented in Fig. 6.

Figure 2:
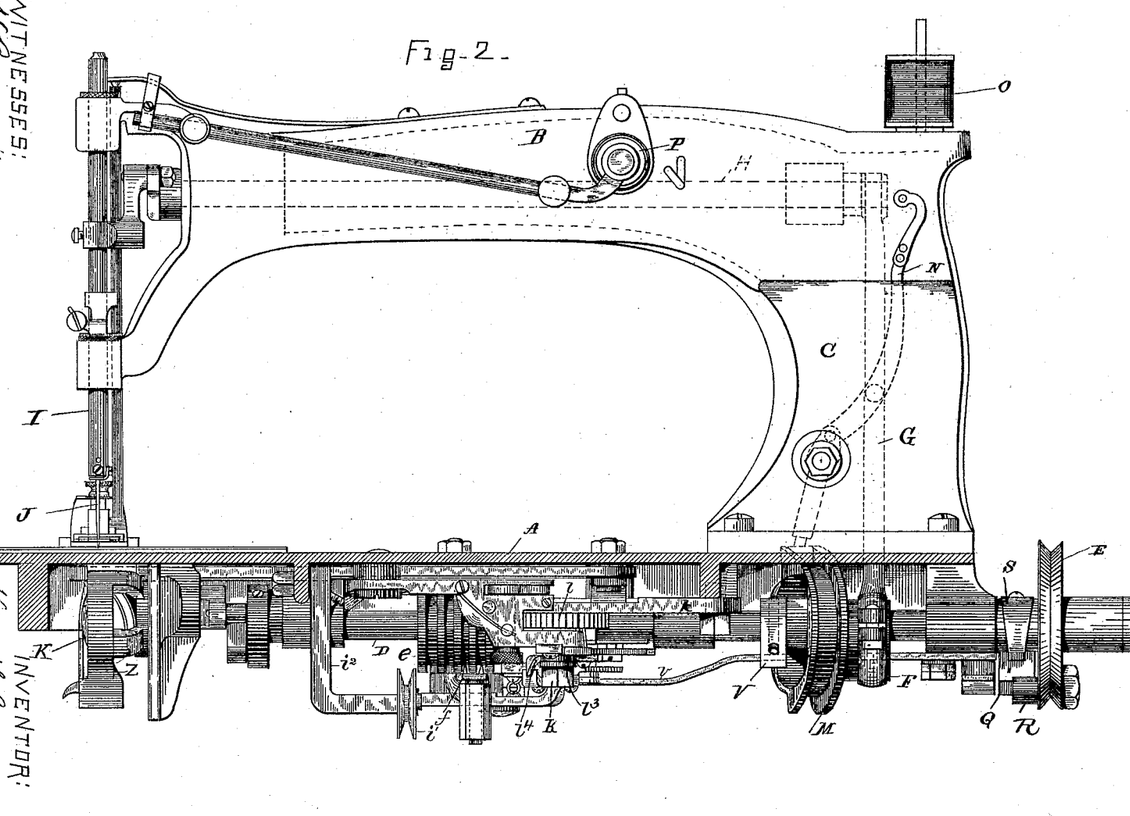
Fig. 2 represents a front view of the same, the front depending flange of the bed being pictured as cut away in order to show the parts therebehind.

To effect the pushing back or upward of pins $p$ $o$ automatically at the proper moment, I pivot a lever, $q$, on stud $j'$, as shown in Fig. 9, which lever extends backward and around under pin $p$, (see also Fig. 1,) and has a finger, $q'$, adjustably secured to its under side, which finger projects forward and upward, so that its free end will be brought into the path of travel of wiper $l^4$ on the side of stud $k'$ opposite that at which the end of finger $m$ is located, so that when the parts are in the position in which they are represented in Fig. 2 and the machine is set in motion the end $a^4$ of button-holder-operating lever will be reciprocated, as represented by the arrows in Fig. 5, and sewing will be performed through the eyes 9 9 of the button, as shown in Fig. 19, until worm-wheel $l$ is turned substantially one-half-way around, when wiper $l^4$ will come in contact with finger $q'$, depress the same, rocking lever $q$ on its fulcrum-pin $j'$, and raising its rear end, so as to press upward or backward pins $p$ $o$ from the position portrayed in Fig. 9 to that shown in Fig. 10, when, by the operation of spring $n'$, block $c$ will be shifted from the position represented in Fig. 5 to that represented in Fig. 6, resulting in reciprocating lever $a$, as indicated by the arrows in the last-mentioned figure, and sewing through the eyes 9' 9' of the buttons until the worm-wheel completes a revolution, at which moment wiper $l^4$ will be brought in contact with the forward end of finger $m$, with the effect of stopping the machine, as before described. In this way button after button may be sewed on with a cross-stitch, the machine stopping at the completion of each operation to permit the work to be moved and a new button inserted in the holder.

It should have been explained that in operating lever $h$ to set the machine in motion arm $h^6$ is moved far enough to draw back link $n^2$, so as to set slide $c$ in the position represented in Figs. 1, 5, and 10, the slot in said link allowing said slide and its connected parts to move from the position shown in the last-mentioned figure to that pictured in Figs. 6 and 9 without disturbing the position of the parts which lock the machine in operative position.

Figure 11:
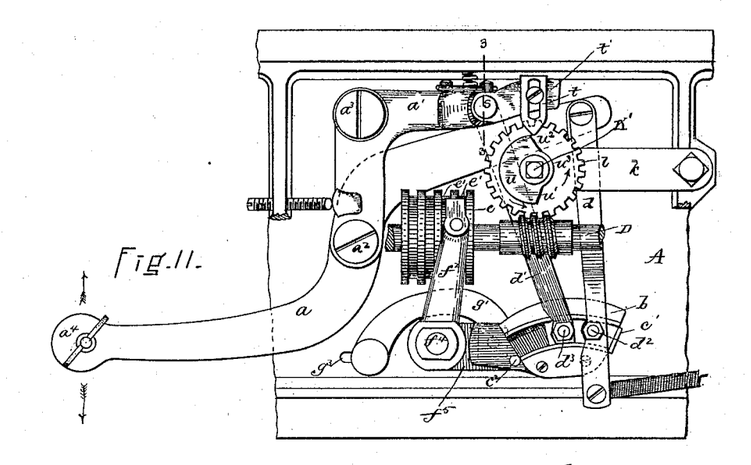
Fig. 11 is a view similar to Fig. 5, showing the contrivances employed for sewing on a four-hole button with a parallel-bar stitch.

To effect the sewing on of a button with a parallel-bar stitch, as represented in Fig. 20, I remove stud $n^3$, disconnecting link $n^2$ from the extension $n$ of bar or rod $d$, so that the slide $c$ will always remain in the position in which it is represented in Figs. 6 and 11. I then disconnect bar or rod $d'$ from branch $a'$ of lever $a$ by withdrawing spring-pressed stud $r$ from groove $r'$ of pivot-pin $s$ and draw down said pin until said stud $r$ snaps into groove $r^2$, when pin $s'$ will be held in withdrawn position, allowing lever $a$ to move without interference from rod or bar $d'$. Wiper $t$, adjustable on an extension, $t'$, of branch $a'$ of lever $a$, is then set, so that its rearward end will rest against the lower face, $u^3$, of cam $u$, all as shown in Fig. 11. With this position of the parts and the machine in operation end $a^4$ of button-holder-operating lever will be reciprocated, as indicated by the arrows in the last-mentioned figure, sewing through eyes 8 8, Fig. 20, of the button until the incline $u'$ of cam $u$ comes in contact with wiper $t$, which will suddenly effect a slight movement of lever $a$ on a line at right angles with the arrows pictured in Fig. 11, the reciprocations of the button-holder-operating lever continuing as before, and sewing being effected through the eyes 8' 8' of the button until wiper $t$ reaches incline $u^2$ and drops to the lower portion, $u^3$, of the cam, at which time wiper $l^4$ will come in contact with finger $m$ and stop the machine.

Figures 12, 13, 15:
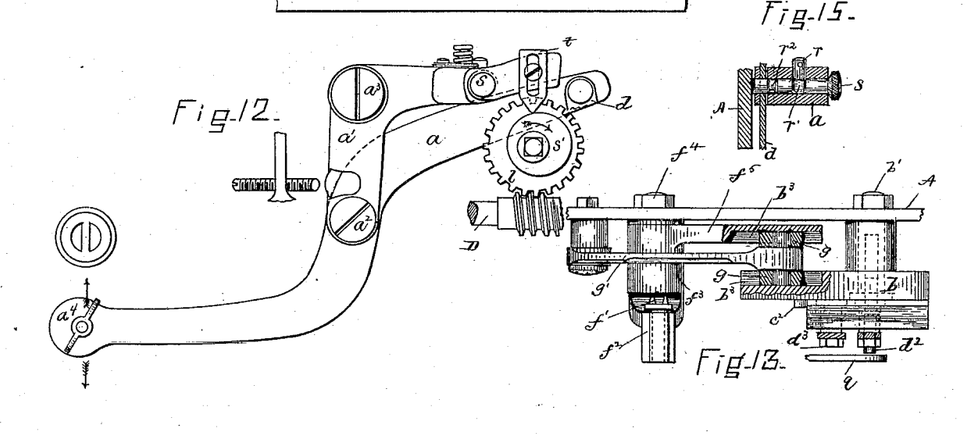
Fig. 12 is a detail view hereinafter referred to in explaining the operation of the machine in sewing on a bar-button.
Fig. 13 is a detail view, parts being pictured as broken away, hereinafter referred to in explaining the connection of the quadrant with its operating means.
Fig. 15 is a detail sectional view on the line 3 3, Fig. 11.

To sew on a bar-button like that represented in Fig. 21, an eccentric or cam, $s'$, is substituted for cam $u$, and wiper $t$ set so that said cam $s'$ may operate thereon, as shown in Fig. 12, the result of which will be that lever $a$ will be reciprocated, as indicated by the arrows in the last-mentioned figure, so as to sew across bar 7 of the button, Fig. 21, and be gradually drawn in a direction at right angles to said arrows, forming the stitches over bar 7 from one end thereof to the other and return, the reciprocations of the lever $a$ in the direction of the arrows being effected through the medium of bar or rod $d$, and the transverse movements through the medium of cams $u$ $s'$, wiper $t$, and branch $a'$ of said lever.

A two-hole button may be sewed on by "setting" wiper $t$ back so as not to be affected by the cams $u$ or $s'$, and with the parts in position as represented in Figs. 6 and 11, and link $n^2$ disconnected from part $n$, which will result in a single reciprocatory movement of lever $a$ and the sewing through eyes 7' 7' of the button, as shown in Fig. 22.

X represents the button-holder and presser-foot, consisting of a spring-steel plate, $v$, adapted to rest on the bed of the machine, and to which the forward end, $a^4$, of the lever $a$ is secured by means of a bolt, $v'$, and a thumb-screw, $v^2$. Said plate $v$ is bent at its rearward end, as at $v^3$, so that a portion, $v^4$, thereof extends forward above the main portion $v$ and substantially parallel therewith, to which portions $v^4$ the button-holder and presser-foot lever $w$ are secured by means of screws $w'$ $w'$.

$x$ represents a duplex button-holder—that is, a two-armed device—each arm of which is adapted to receive and hold a button, which button-holder is pivoted to lever $w$ by means of a thumb pin or bolt, $x'$, passing through the forward end of lever $w$ and screwed into the button-holder $x$, as best seen in Fig. 17.

Button-holder $x$ is provided on its upper surface with flanges $x^2$ $x^2$, Fig. 18, between which the forward end of lever $w$ is adapted to rest and fit therebetween in a snug manner.

$w^2$ indicates a flat spring secured at its rear end to lever $w$ and at its forward end embracing thumb-pin $x'$ and bearing upward against the head of said thumb-pin $x'$, so as to hold the button-holder up against the button-holder lever, and at the same time permit it to be pressed downward therefrom by means of the thumb-pin $x'$, so that its flanges $x^2$ $x^2$ may escape the button-holder lever, and so allow either arm of the button-holder lever to be brought in line vertically with the needle. The object of the duplex character of the button-holder is to adapt the same device to different-sized buttons.

$y$ indicates a link, to which a rod or chain connecting the button-holder lever with a treadle or like device (not shown) may be attached to raise said lever by the movement of the operator's foot whenever desired.

$z$ indicates a presser-bar resting at its lower end on the button-holder lever and borne upon at its upper end by a spring, $z'$.

It will be noticed that it is the peculiar construction of the button-holder-operating lever that enables me to adapt my invention to the sewing on of buttons having different forms of eyes, as described, and that by the oscillating quadrant and the moving slide therein, as also worm-wheel $l$, I am enabled to operate said lever as desired.

The purposes, advantages, and mode of operating other parts of the invention have been so fully explained hereinbefore as not to need further mention.

While I have been particular to describe the exact form and arrangement of all the parts, as herein shown, it is obvious that these may be changed without departing from the nature or spirit of the invention.

Having thus described my invention, what I claim is—

1. In a button-sewing machine, the combination, with the machine-bed, a sewing mechanism, and a button-holder, of a button-holder-operating lever, $a$, and an angular arm or branch lever, $a'$, said arm or branch being pivoted to the bed and at one end pivotally connected with said lever, whereby either the pivotal connection of the lever with the arm or branch or the pivotal connection of the branch with the bed may be employed as the fulcrum of the lever in the operation of the latter, as set forth.

2. In a button-sewing machine, the combination, with the machine-bed, a sewing mechanism, and a button-holder, of a button-holder-operating lever, $a$, an angular arm or branch lever, $a'$, said arm or branch being pivoted to the bed and at one end pivotally connected with said lever, rods or bars pivotally connected with the free ends of said lever and arm or branch, an oscillating quadrant, and a block movable or adjustable on said oscillating quadrant to which the other ends of the rods or bars are pivoted, as set forth.

3. In a button-sewing machine, the combination, with the machine-bed, a sewing mechanism, and a button-holder, of a button-holder-operating lever, $a$, an arm or branch lever, $a'$, said arm or branch being pivoted to the bed and at one end pivotally connected with said lever, and a cam for operating on the free end of said branch lever, as set forth.

4. In a button-sewing machine, the combination, with the machine-bed, a sewing mechanism, and a button-holder, of a button-holder-operating lever, $a$, an angular arm or branch lever, $a'$, said arm or branch being pivoted to the bed and at one end pivotally connected with said lever, rods or bars $d$ $d'$, the former pivotally connected with the free end of lever $a$ and the latter detachably pivoted to the free end of branch $a'$, an oscillating quadrant, and a block movable or adjustable on said quadrant to which the other ends of rods or bars $d$ $d'$ are pivoted, as set forth.

5. In a button-sewing machine, the combination, with the bed of the machine, a sewing mechanism, and a button-holder, of a button-holder-operating lever, $a$, branch $a'$, rods or bars $d$ $d'$, the former pivoted to one end of said lever and the latter pivoted to one end of said branch, an oscillating quadrant, a block movable or adjustable on said quadrant, mechanism, substantially as described, for locking said block in one position on said quadrant, and devices, substantially as described, for unlocking or releasing said block to permit it to be moved to another position on said quadrant, as set forth.

6. In a button-sewing machine, the combination, with the machine-bed, a sewing mechanism, a button-holder, and a button-holder-operating lever, of a quadrant pivoted on the bed, a rod or link connecting the quadrant with the button-holder-operating lever, and means for oscillating said quadrant, such means consisting of a rotary cam, a pivoted switch-lever adapted to engage said cam and be oscillated thereby, and an arm, $f^5$, rigidly connected with said switch-lever and loosely connected with said quadrant, as set forth.

7. In a button-sewing machine, the combination, with a sewing mechanism, a button-holder, and button-holder-operating lever, of an oscillating grooved quadrant, a rod or link connecting the quadrant with the button-holder-operating lever, an oscillating switch-lever provided with a grooved arm, $f^5$, the bed of the machine provided with a slot, $g^3$, arm $g'$, adjustably pivoted in said slot $g^3$, and blocks $g$ $g$, adapted to slide in the groove of the said quadrant and arm $f^5$, to which blocks the other end of arm $g'$ is pivoted, as set forth.

8. In a button-sewing machine, the combination, with a sewing mechanism, a button-holder, and button-holder-operating lever, of a quadrant, $b$, provided with a groove, $b^2$, a slide, $c$, in said groove, a rod or link connecting said slide with said button-holder-operating lever, and means for locking said slide in said groove and releasing the same, consisting of pin $o$ and spring $o'$, a stud or bolt, $b'$, connected with said quadrant, in a hole or bore of which stud or bolt said pin and spring are arranged, pin $p$, a lever at one of its ends in contact with said pin, and a cam or wiper to act upon the other end of said lever, adapted to operate in slide $c$, as set forth.

9. In a button-sewing machine, the combination, with a button-holder-operating lever, of plate $v$, button-holder lever $w$, duplex button-holder $x$, thumb-pin $x'$, and spring $w^2$, as set forth.

In testimony whereof I have signed my name to this specification, in the presence of two subscribing witnesses, this 11th day of April, A. D. 1887.

HENRY H. CUMMINGS.

Witnesses:
 ARTHUR W. CROSSLEY,
 C. F. BROWN.